(12) United States Patent
Magnaldo

(10) Patent No.: US 8,529,769 B2
(45) Date of Patent: Sep. 10, 2013

(54) USE OF CERTAIN CHEMICAL ELEMENTS FOR INHIBITING THE FORMATION OF PRECIPITATES CONTAINING ZIRCONIUM MOLYBDATE IN AN AQUEOUS SOLUTION CONTAINING THE ELEMENT MOLYBDENUM AND THE ELEMENT ZIRCONIUM

(75) Inventor: Alastair Magnaldo, Connaux (FR)

(73) Assignees: Areva NC, Paris (FR); Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 13/503,345

(22) PCT Filed: Oct. 27, 2010

(86) PCT No.: PCT/EP2010/066212
§ 371 (c)(1),
(2), (4) Date: Sep. 12, 2012

(87) PCT Pub. No.: WO2011/051311
PCT Pub. Date: May 5, 2011

(65) Prior Publication Data
US 2012/0328492 A1     Dec. 27, 2012

(30) Foreign Application Priority Data
Oct. 28, 2009  (FR) ...................... 09 57590

(51) Int. Cl.
*C03C 23/00*    (2006.01)

(52) U.S. Cl.
USPC ................................ 210/696; 423/20; 423/58

(58) Field of Classification Search
USPC ...................... 423/20, 58; 210/696; 376/311
See application file for complete search history.

(56) References Cited

U.S. PATENT DOCUMENTS 3,288,570 A * 11/1966 Henrickson ....................... 423/6
3,932,225 A    1/1976 Bilal et al.
2004/0045935 A1* 3/2004 Magnaldo ........................ 216/83

FOREIGN PATENT DOCUMENTS
GB    1008066    10/1965

OTHER PUBLICATIONS

International Search Report dated Nov. 29, 2010 for PCT Application No. EP2010/066212 filed on Oct. 27, 2010.
French Search Report dated Jul. 15, 2010 for French Application No. 0957590.

* cited by examiner

*Primary Examiner* — Steven Bos
(74) *Attorney, Agent, or Firm* — Knobbe Martens Olson and Bear, LLP

(57) ABSTRACT

A method inhibits the formation of zirconium molybdate precipitate in an aqueous solution containing the element molybdenum and the element zirconium by adding a chemical element selected from plutonium, tellurium, antimony and mixtures thereof with the aqueous solution. The method can be used for reprocessing used fuels with the element molybdenum and the element zirconium.

13 Claims, 1 Drawing Sheet

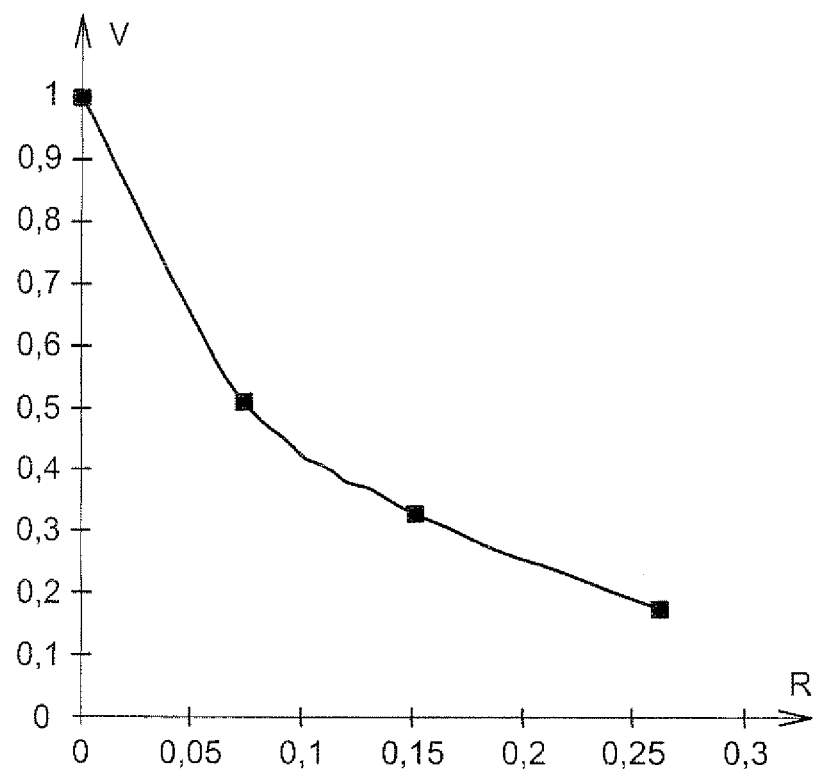
SINGLE FIGURE

USE OF CERTAIN CHEMICAL ELEMENTS FOR INHIBITING THE FORMATION OF PRECIPITATES CONTAINING ZIRCONIUM MOLYBDATE IN AN AQUEOUS SOLUTION CONTAINING THE ELEMENT MOLYBDENUM AND THE ELEMENT ZIRCONIUM

RELATED APPLICATIONS

This application is a U.S. National Phase of International Application No. PCT/EP2010/066212, filed Oct. 27, 2010, designating the U.S., and published in French as WO 2011/051311 on May 5, 2011 which claims the benefit of French Patent Application No. 0957590 filed Oct. 28, 2009.

BACKGROUND OF THE INVENTION

1. Field of the Invention

The invention relates to the use of certain chemical elements for inhibiting the formation of precipitates comprising zirconium molybdate.

This invention most particularly finds application in the field of reprocessing of used fuels, where it may be used for inhibiting the formation of precipitates comprising zirconium molybdate in nitric reprocessing solutions comprising the element molybdenum and the element zirconium.

2. Description of the Related Art

Molybdenum and zirconium are two major fission products encountered during methods for reprocessing used fuels, notably during steps for dissolving irradiated fuels and for concentrating fission products and for storing the resulting solutions. Beyond a concentration above that of the solubility of the elements molybdenum and zirconium in the liquid medium in which they are located (generally a nitric solution), the aqueous forms of molybdenum and zirconium may precipitate in order to form solid precipitates comprising zirconium molybdate hydrate.

The formation of these precipitates may mainly pose two types of problem.

The first is the formation of fouling layers which may hamper proper operation of the apparatus set into play in the reprocessing of used fuels, or even damage them irreversibly.

The second one is the carrying off and accumulation of secondary ions in the precipitates, which may occur either by inclusion in the latter or by adsorption at the surface of the latter. For example, plutonium is carried off by formation of mixed zirconium and plutonium molybdate precipitate. Another example is cesium, which may be carried off by its adsorption on zirconium molybdate. Thus, generally, accumulation of radio-elements and of fissile material may result therefrom and this in any apparatus of the process in fine receiving the dissolution solutions or receiving zirconium molybdate formed upstream.

In order to find a remedy for these drawbacks, curative actions have been undertaken in order to remove the formed zirconium molybdate precipitates. These curative actions may be of a mechanical order or a chemical order, notably by dissolving the precipitates formed by action of soda or of a solution comprising carbonate ions. But these solutions have consequent impacts, since they generate additional effluents, which should then be treated.

Presently, no technical suggestion intended for hindering the formation of precipitates comprising zirconium molybdate, notably in solutions for reprocessing used fuels, has been proposed in the literature. The only studies relating to zirconium molybdate in the method for reprocessing used fuels are focused on the formation kinetics of precipitate depending on the operating conditions, on temperature, acidity and concentration. Other more general studies have described possible applications of zirconium molybdate as a catalyst, ion exchanger, intermediate product for the formation of $ZrMo_2O_8$.

Therefore, there exists a real need for a technical solution with which it is possible to reduce, or even prevent the formation of precipitates comprising zirconium molybdate in an aqueous solution, such as a nitric solution, comprising the element molybdenum and the element zirconium, other than by acting on the operating conditions of temperature, acidity and concentration.

SUMMARY OF THE INVENTION

The inventors have therefore discovered surprisingly that certain chemical elements may contribute to inhibiting the formation of precipitates comprising zirconium molybdate in an aqueous solution comprising the element molybdenum and the element zirconium.

The invention therefore relates to the use of at least one chemical element selected from plutonium, tellurium, antimony and mixtures thereof for inhibiting the formation of a precipitate comprising zirconium molybdate in an aqueous solution comprising the element molybdenum and the element zirconium.

In order to enter into more detail in the description, we specify the following definitions.

By precipitate is conventionally meant an insoluble solid body formed from at least two soluble chemical elements (here, molybdenum and zirconium) present in a certain portion in an aqueous solution, the formation of this body occurring once the solubility limit of the aforementioned chemical elements has been exceeded. The formation of a precipitate may involve conventionally two phenomena:
  a first nucleation phenomenon during which the chemical elements react with each other for forming solid nuclei precursors of the precipitate;
  a second phenomenon said to be of crystalline growth of crystallites from the solid nuclei formed beforehand.

By inhibition, is conventionally meant the action of causing reduction or even suppression of the formation of precipitates comprising zirconium molybdate.

Without intending to be bound by theory, some of the elements listed above will involve chemical modifications of the precipitate comprising zirconium molybdate. Thus as an example, plutonium in its Pu(IV) form is at least partly substituted for zirconium in zirconium molybdate, in order to give a mixed molybdate of plutonium and zirconium which is more soluble than zirconium molybdate, for example in a solution of nitric acid. The result is a rapid increase in the solubility of the solid solution with the ratio Pu(IV)/(Zr+Pu (IV)) and therefore a reduction in the chemical precipitation force.

In particular, the aqueous solution of the invention may be a solution of nitric acid, which may notably stem from the dissolution of a used nuclear fuel with nitric acid. The solution of nitric acid may for example have a normality from 0.5 to 6 N and may have a temperature ranging from 20° C. to the boiling temperature thereof.

The elements used as an inhibitor within the scope of the invention have the advantage of not being organic inhibitors or further inhibitors comprising phosphate groups, these inhibitors having the particularity of being not very stable, notably in a nitric medium. Furthermore, the inhibitors comprising phosphate groups may cause precipitation of the plutonium, of the zirconium or the molybdenum in the form of phosphates of these elements.

Advantageously, according to the invention, the chemical element capable of inhibiting the formation of zirconium molybdate is plutonium of valence (IV), tellurium of valence (VI), antimony and mixtures thereof.

The aforementioned inhibiting elements may be elements already present in the solutions for reprocessing used fuels. Thus, the inhibition operation may thus consist, at the most, when the amount of aforementioned elements is not sufficient in the initial solution, of introducing into the medium comprising the element molybdenum and the element zirconium, an additional amount of the inhibiting element already present in said solution, so as to increase its concentration.

This additional amount may for example stem from a recycling stream comprising said element. Thus, in this case, the inhibiting element is already present in the conventional reprocessing method and thus does not perturb its operation.

From a practical point of view, the invention may be applied by an inhibition method comprising a step for putting an aqueous solution comprising the element molybdenum and the element zirconium in contact with at least one predetermined amount of at least one element selected from plutonium, tellurium, antimony and/or mixtures thereof, the predetermined amount being selected so as to inhibit the formation of the precipitate comprising zirconium molybdate.

This predetermined amount may be determined by proceeding with the following tests:
- a comparative test with a solution containing molybdenum and zirconium and not comprising any inhibiting element as mentioned above and during which the formed amount of the precipitate comprising formed zirconium molybdate is measured;
- tests with the same solution into which at least one inhibiting element is introduced as mentioned above in different amounts and during which the formed amount of precipitate comprising zirconium molybdate is measured.

The predetermined amount to be introduced for obtaining a reduction or even a suppression of the formation of the precipitate comprising zirconium molybdate may be inferred from these tests.

As an example, the element tellurium is capable of inhibiting the formation of zirconium molybdate for a tellurium element concentration ranging from 0.05 to 1 $g \cdot L^{-1}$ for a solution of nitric acid having a normality from 0.5 to 6 N comprising the element molybdenum at a concentration from 0.5 to 6 $g \cdot L^{-1}$ and the element zirconium at a concentration from 0.5 to 6 $g \cdot L^{-1}$.

As an example, the element plutonium is capable of inhibiting the formation of zirconium molybdate for a plutonium element concentration ranging from 1 t 50 $g \cdot L^{-1}$ for a solution of nitric acid having a normality from 0.5 to 6 N comprising the element molybdenum at a concentration from 0.5 to 6 $g \cdot L^{-1}$ and the element zirconium at a concentration from 0.5 to 6 $g \cdot L^{-1}$.

When the invention is applied to the field of reprocessing used fuels, it may be practically applied by a method for reprocessing a used fuel comprising the element molybdenum and the element zirconium, comprising the following steps:
- a step for dissolving the used nuclear fuel into nitric acid, with which a solution comprising the element molybdenum and the element zirconium is obtained, in amounts capable of generating the formation of a precipitate comprising zirconium molybdate;
- a step for adding to this solution at least one element selected from plutonium, tellurium, antimony and mixtures thereof so as to obtain in the aforementioned solution a concentration of said element required for inhibiting formation of the precipitate comprising zirconium molybdate.

As an example, the amount of tellurium element to be added into the solution is selected so as to obtain in said solution a concentration of the tellurium element ranging from 0.05 to 1 $g \cdot L^{-1}$ for a solution of nitric acid having a normality from 0.5 to 6 N comprising the element molybdenum at a concentration from 0.5 to 6 $g \cdot L^{-1}$ and the element zirconium at a concentration from 0.5 to 6 $g \cdot L^{-1}$.

As an example, the amount of plutonium element to be added into the solution is selected so as to obtain in said solution a plutonium element concentration ranging from 1 to 50 $g \cdot L^{-1}$ for a solution of nitric acid having a normality from 0.5 to 6 N comprising the element molybdenum at a concentration from 0.5 to 6 $g \cdot L^{-1}$ and the element zirconium at a concentration from 0.5 to 6 $g \cdot L^{-1}$.

The invention will be better understood in the light of the additional description which follows, which relates to two examples of application of the invention and which refers to the appended figure.

Of course, this additional description is only given as an illustration of the object of the invention and is by no means a limitation of this object.

BRIEF DESCRIPTION OF THE DRAWINGS

The single figure illustrates a graph illustrating the time dependent change in the relative rates (V) of crystalline growth of zirconium molybdate versus the Te/Mo molar ratio (R) according to the operating conditions applied in Example 2.

DETAILED DESCRIPTION OF THE PREFERRED EMBODIMENT

EXAMPLE 1

This example illustrates the use of plutonium in its degree of oxidation (IV) for inhibiting the formation of zirconium molybdate in a nitric solution comprising the element molybdenum and the element zirconium.

To do this, two 3N nitric acid solutions were prepared under cold conditions:
- a first solution comprising molybdenum and zirconium at 0.7 $g \cdot L^{-1}$;
- a second solution comprising, in addition to molybdenum and zirconium in an amount of 0.7 $g \cdot L^{-1}$, plutonium in its degree of oxidation (IV) in an amount of 1 $g \cdot L^{-1}$.

Both of these solutions are heated in parallel and held at 87° C. The first solution precipitates after about one hour. The second solution does not precipitate but at the end of a heating period of at least 6 hours.

EXAMPLE 2

This example illustrates the use of tellurium Te in its degree of oxidation (VI) for inhibiting the formation of zirconium molybdate in a nitric solution comprising the element molybdenum and the element zirconium.

To do this, a 3N nitric acid solution is prepared, comprising 0.8 $g \cdot L^{-1}$ of molybdenum and 0.8 $g \cdot L^{-1}$ of zirconium, i.e.

concentrations close to those which may be encountered during the dissolution of irradiated fuels.

To this solution, tellurium in its degree of oxidation (VI) is introduced in the form of telluric acid and the relative crystalline growth rate (V) of zirconium molybdate is measured versus the Te (VI) concentration (in $g \cdot L^{-1}$) in a circular reactor comprising the following elements:

quartz crystal microscales located on the side portion of the reactor;

a stirring device with which it is possible to guarantee growth conditions not limited by molecular diffusion;

an inlet through which the solution may be introduced.

The quartz crystal microscales and its associated analyzer (QCA-917, EG&G) give the possibility of obtaining on contact of the solution, values of resonance amplitude and frequency. By applying a model, it is possible to extract from these values, the changes in mass and density-viscosity and to relate these changes to the amount of precipitate formed.

The measurements are plotted on the single figure. For example, it may be seen that the crystalline growth is slowed down by a factor close to 6, when the molar ratio Te/Mo is (1/4), i.e. about 0.27 $g \cdot L^{-1}$ of Te. No other body is formed in the solution.

EXAMPLE 3

This example illustrates the use of antimony (Sb) for delaying the nucleation instant and the growth kinetics of zirconium molybdates in a nitric solution containing the element molybdenum and the element zirconium.

To do this, a solution of nitric acid comprising about 2 $g \cdot L^{-1}$ of molybdenum and about 2 $g \cdot L^{-1}$ of zirconium is prepared.

To this solution, antimony with a mixed degree of oxidation between (V) and (VI) is added in the form of a solution with a high nitric concentration and a high antimony concentration, in order to form a final solution comprising a nitric acidity of 3 N with 2 $g \cdot L^{-1}$ of molybdenum, 2 $g \cdot L^{-1}$ of zirconium and 0.2 $g \cdot L^{-1}$ of antimony.

The solution is brought to a temperature of 80° C., and the time for the first crystals to appear is observed.

In the presence of antimony, the solution begins to precipitate and becomes cloudy after 180 minutes, instead of 20 minutes for an identical solution but without any antimony.

Microscopic observation of the crystals formed in the presence of antimony show a very strong change in the crystalline facies (needles) relatively to the crystals formed without the presence of antimony (cubes).

What is claimed is:

1. A method for inhibiting the formation of a precipitate in an aqueous solution, wherein the precipitate comprises zirconium molybdate and the aqueous solution comprises the element molybdenum and the element zirconium, the method comprising adding at least one chemical element selected from the group consisting of plutonium, tellurium, antimony and mixtures thereof to the aqueous solution.

2. The method according to claim 1, wherein the chemical element is selected from the group consisting of plutonium with valence (IV), tellurium with valence (VI), antimony and mixtures thereof.

3. The method according to claim 1, wherein the aqueous solution is a nitric acid solution.

4. The method according to claim 3, wherein the nitric acid solution stems from the dissolution of a used nuclear fuel by nitric acid.

5. The method according to claim 3, wherein the nitric acid solution has normality ranging from 0.5 to 6 N.

6. The method according to claim 3, wherein the nitric acid solution has a temperature ranging from 20° C. to the boiling temperature of the solution.

7. The method according to claim 1, wherein the chemical element is plutonium with valence (IV).

8. The method according to claim 1, wherein the plutonium has a concentration ranging from 1 to 50 $g \cdot L^{-1}$ for a nitric acid solution having a normality from 0.5 to 6 N, the solution comprising the molybdenum at a concentration from 0.5 to 6 $g \cdot L^{-1}$ and the zirconium at a concentration from 0.5 to 6 $g \cdot L^{-1}$.

9. The use method according to claim 1, wherein the chemical element is tellurium with valence (VI).

10. The method according to claim 1, wherein the tellurium has a concentration ranging from 0.05 to 1 $g \cdot L^{-1}$ for a nitric acid solution having normality from 0.5 to 6 N, the solution comprising the molybdenum at a concentration from 0.5 to 6 $g \cdot L^{-1}$ and the zirconium at a concentration from 0.5 to 6 $g \cdot L^{-1}$.

11. A method for reprocessing a used nuclear fuel comprising the element molybdenum and the element zirconium, successively comprising the following steps:

dissolving the used nuclear fuel into nitric acid, by which a solution is obtained comprising the molybdenum and the zirconium in amounts capable of generating the formation of a precipitate comprising zirconium molybdate; and adding at least one element selected from the group consisting of plutonium, tellurium, antimony and mixtures thereof to the solution so as to attain in the solution a concentration of said at least one element required for inhibiting the formation of the precipitate comprising zirconium molybdate.

12. The method according to claim 11 comprising, for a solution of nitric acid having a normality from 0.5 to 6 N comprising the molybdenum at a concentration from 0.5 to 6 $g \cdot L^{-1}$ and the zirconium at a concentration from 0.5 to 6 $g \cdot L^{-1}$, adding the tellurium, during an additional successive step, in an amount so as to obtain a concentration of the tellurium ranging from 0.05 to 1 $g \cdot L^{-1}$.

13. The method according to claim 11 comprising, for a solution of nitric acid having a normality from 0.5 to 6 N comprising the molybdenum at a concentration from 0.5 to 6 $g \cdot L^{-1}$ and the zirconium at a concentration from 0.5 to 6 $g \cdot L^{-1}$, adding the plutonium, during an additional successive step, in an amount so as to obtain a concentration of the plutonium ranging from 1 to 50 $g \cdot L^{-1}$.

* * * * *